US012752981B2

(12) United States Patent
Paccaud et al.

(10) Patent No.: US 12,752,981 B2
(45) Date of Patent: Oct. 6, 2026

(54) DROPPER DISPENSER

(71) Applicant: TEXEN, Brion (FR)

(72) Inventors: Denis Paccaud, Lyons (FR); Romain Miller, Sallanches (FR); Frederic Strubi, Lyons (FR); Philippe Lantenois, Oullins (FR)

(73) Assignee: Texen, Brion (FR)

( * ) Notice: Subject to any disclaimer, the term of this patent is extended or adjusted under 35 U.S.C. 154(b) by 173 days.

(21) Appl. No.: 18/899,214

(22) Filed: Sep. 27, 2024

(65) Prior Publication Data

US 2025/0145344 A1 May 8, 2025

(30) Foreign Application Priority Data

Sep. 29, 2023 (FR) ....................................... 2310456

(51) Int. Cl.
*B65D 47/18* (2006.01)
*B05B 11/00* (2023.01)
*B05B 11/10* (2023.01)

(52) U.S. Cl.
CPC ........ *B65D 47/18* (2013.01); *B05B 11/00446* (2018.08); *B05B 11/1067* (2023.01)

(58) Field of Classification Search
CPC .............. B65D 47/18; B05B 11/00446; B05B 11/1067
USPC .......................................................... 222/162
See application file for complete search history.

(56) References Cited

U.S. PATENT DOCUMENTS 5,024,355 A * 6/1991 Jouillat ............... B05B 11/0064 222/162
2007/0269251 A1* 11/2007 Skalitzky ............ B05B 11/0002 401/2
2015/0335475 A1* 11/2015 Lamboux ............. B65D 47/205 604/521
2021/0229879 A1* 7/2021 Choi ...................... A45D 40/26

FOREIGN PATENT DOCUMENTS

EP 1466668 B1 1/2006
FR 2645509 A1 10/1990

OTHER PUBLICATIONS

French Preliminary Search Report issued Mar. 21, 2024, in corresponding French Application No. 2310456, 16 pages.

* cited by examiner

*Primary Examiner* — Jeremy Carroll
(74) *Attorney, Agent, or Firm* — Maier & Maier, PLLC

(57) ABSTRACT

A cosmetic product applicator dispenser, including: a bottle with a longitudinal axis, forming a reservoir of product to be dispensed, a base serving as a support for the bottle, a locking system to lock the bottle on the base, the bottle, when locked on the base, axially movable between an upper and lower end position, a product dispensing area configured to allow the formation of drops of product, a pump system configured so that an axial displacement of the bottle from the lower position to the upper position causes air to move towards the bottom of the bottle, the air thus moved carrying with it the product present in the bottle to a product storage area, and so that an axial displacement of the bottle from the upper end position to the upper position causes the product to circulate from the product storage area to the dispensing area.

13 Claims, 35 Drawing Sheets

[Fig. 1]
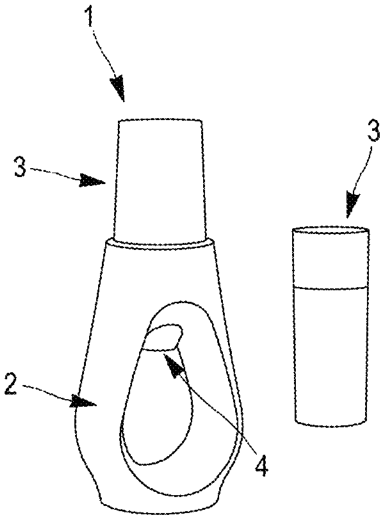
[Fig. 2]
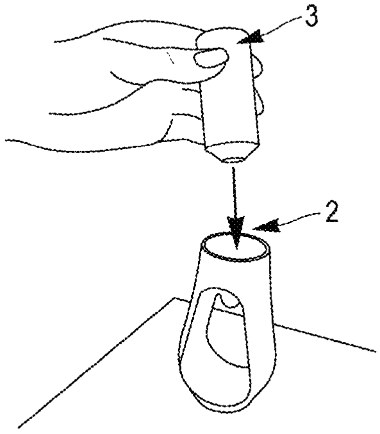
[Fig. 3]
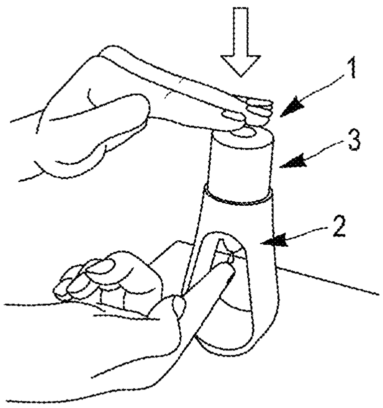

[Fig. 4]
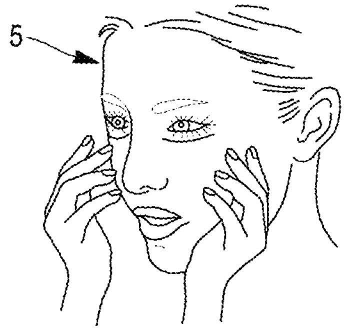
[Fig. 5]
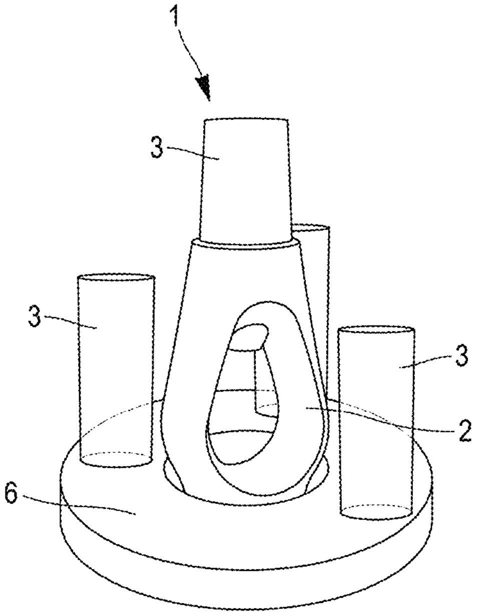

[Fig. 6]
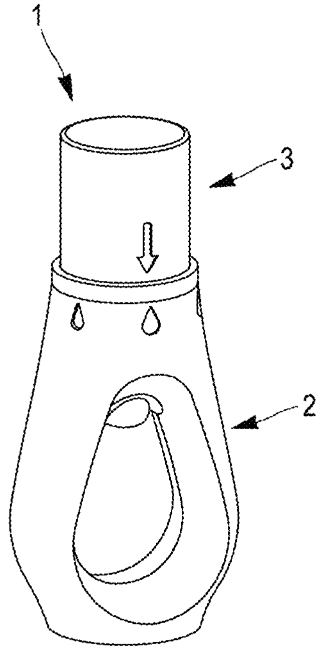
[Fig. 7]
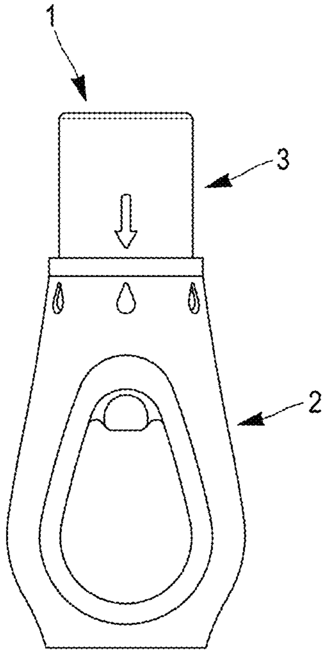

[Fig. 8]
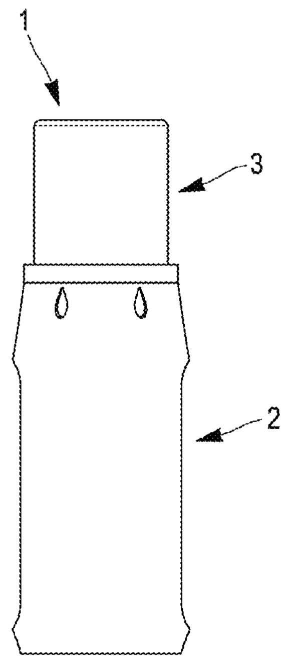
[Fig. 9]
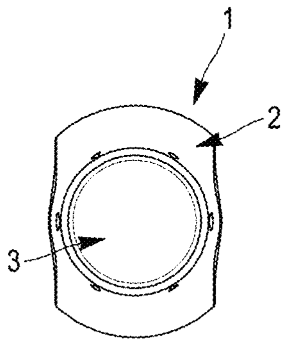

[Fig. 10]
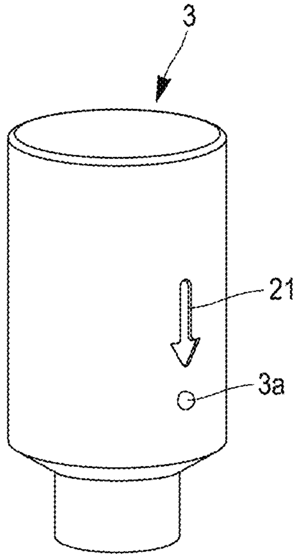
[Fig. 11]
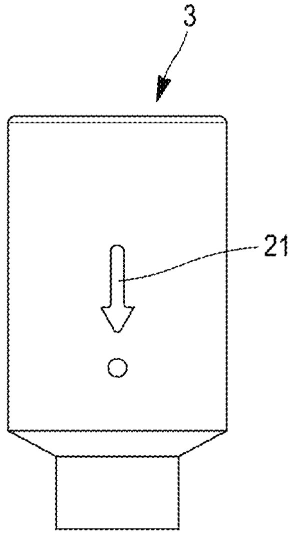

[Fig. 12]
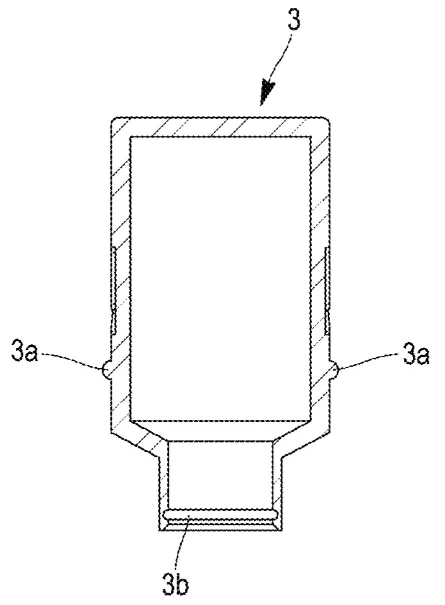
[Fig. 13]
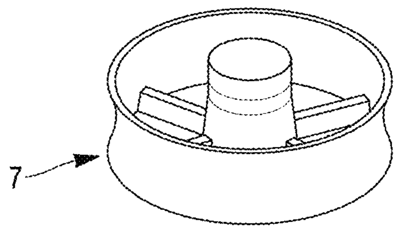
[Fig. 14]
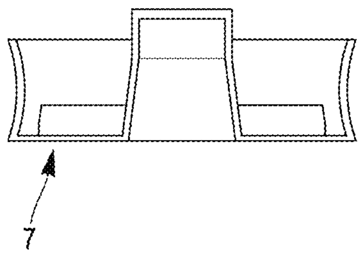
[Fig. 15]
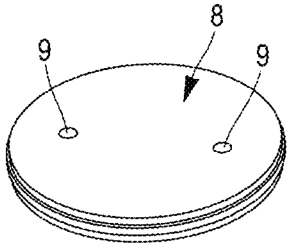

[Fig. 16]
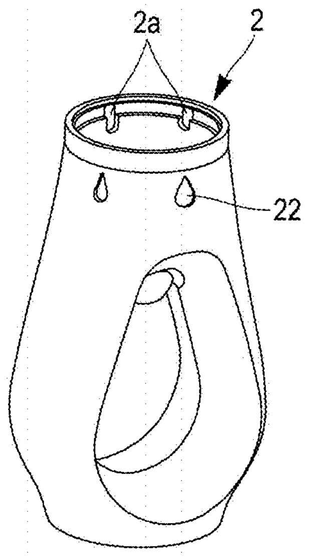
[Fig. 17]
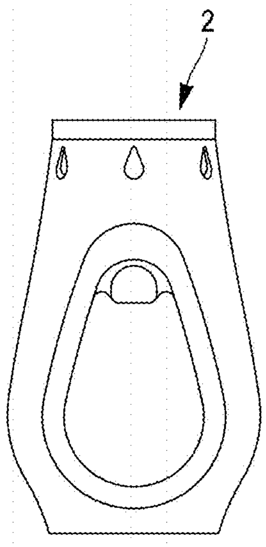

[Fig. 18]
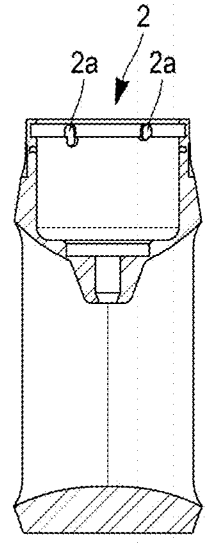
[Fig. 19]
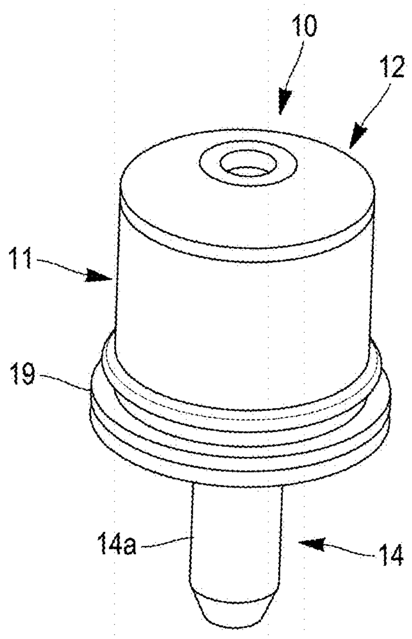

[Fig. 20]
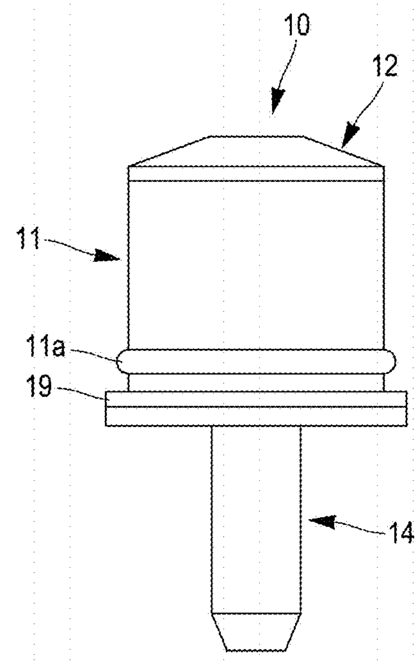
[Fig. 21]
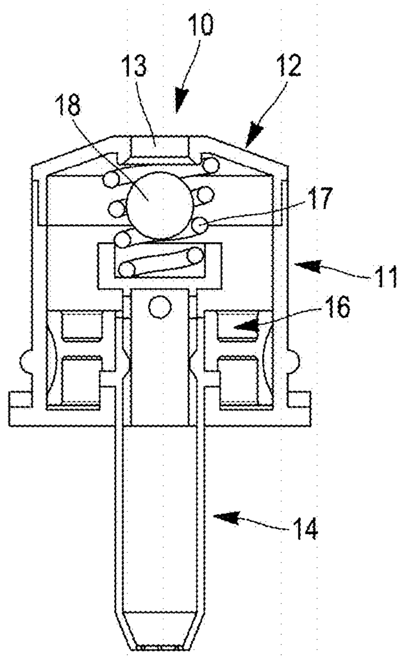

[Fig. 22]
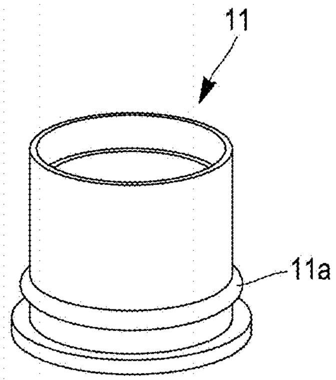
[Fig. 23]
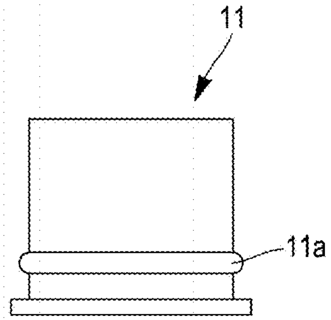
[Fig. 24]
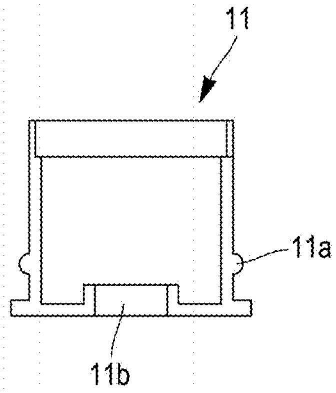
[Fig. 25]
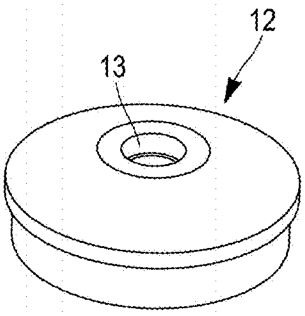

[Fig. 26]
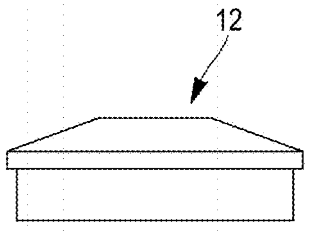
[Fig. 27]
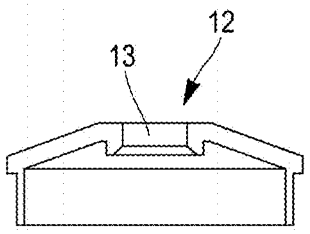
[Fig. 28]
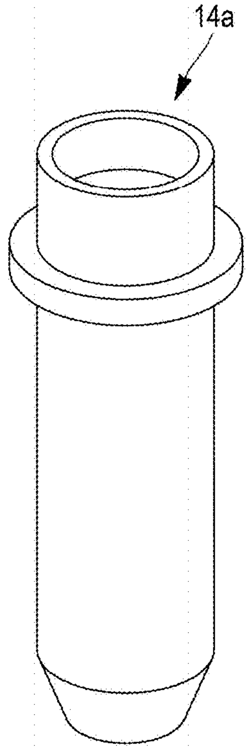

[Fig. 29]
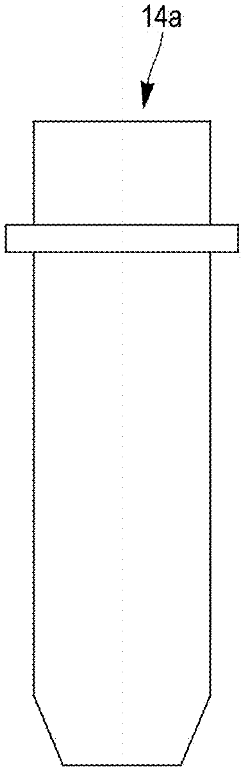
[Fig. 30]
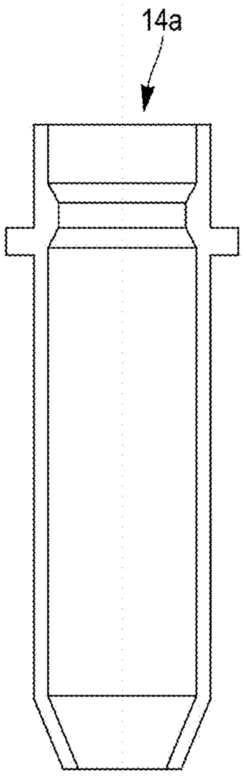

[Fig. 31]
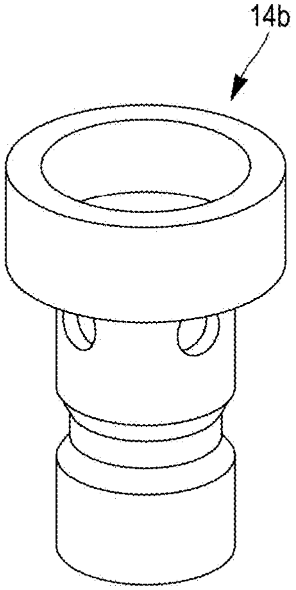
[Fig. 32]
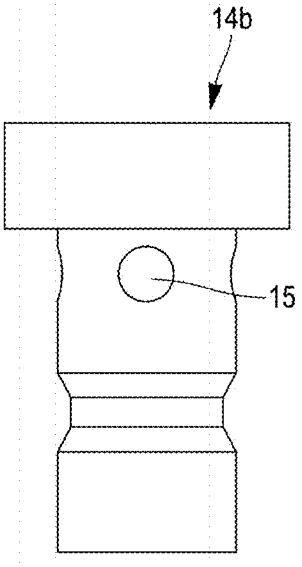

[Fig. 33]
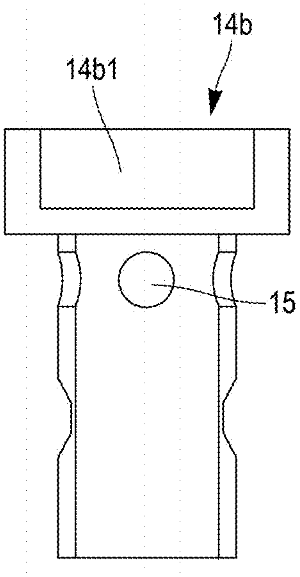
[Fig. 34]
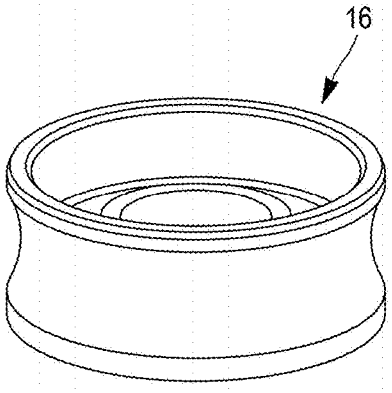
[Fig. 35]
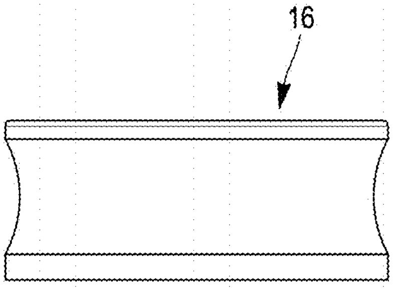

[Fig. 36]
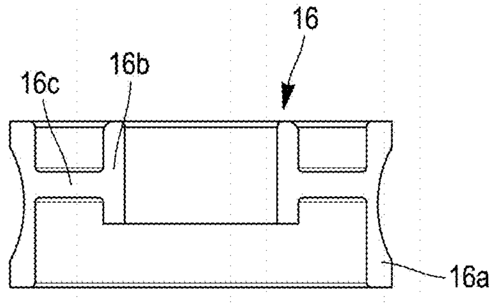
[Fig. 37]
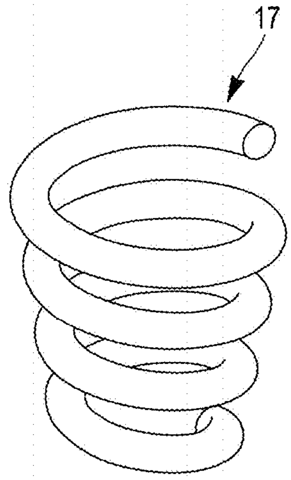
[Fig. 38]
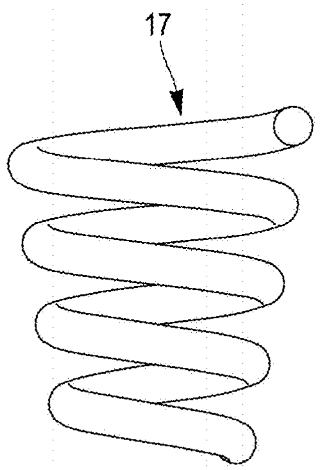

[Fig. 39]
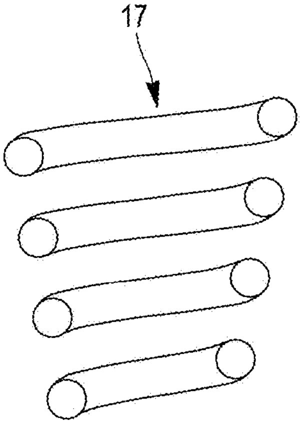
[Fig. 40]
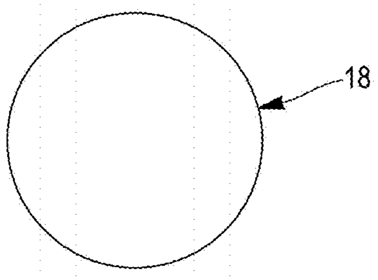
[Fig. 41]
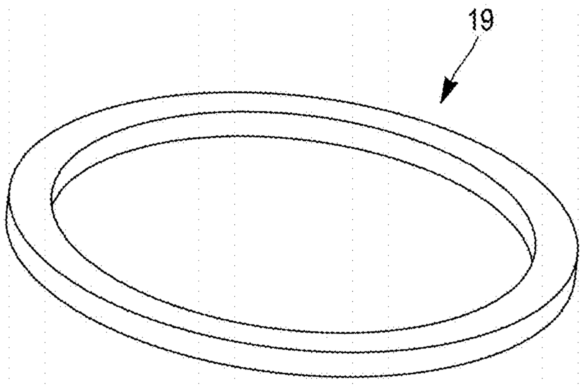

[Fig. 42]
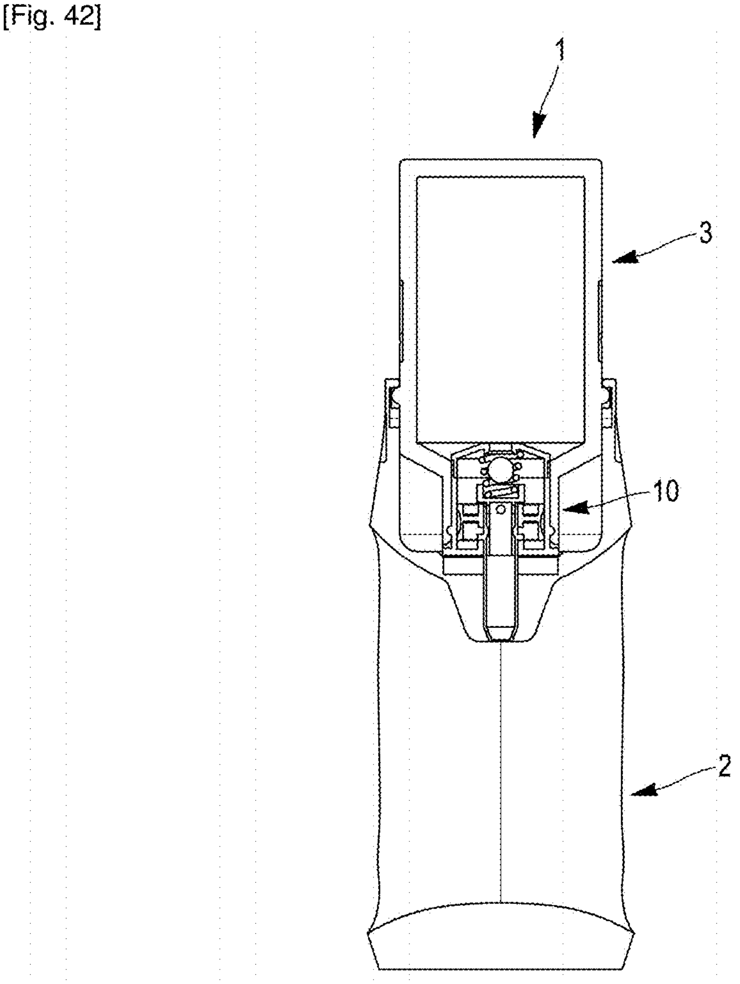

[Fig. 43]
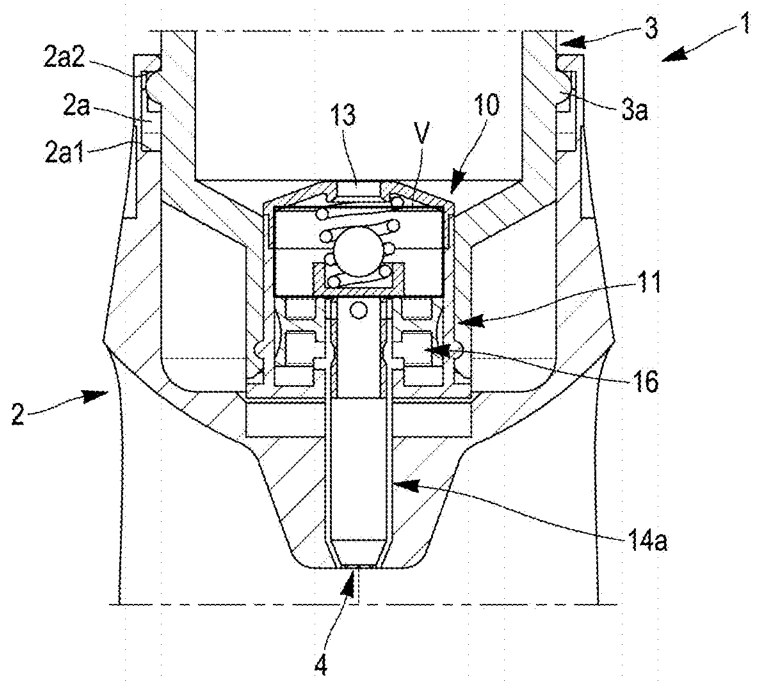
[Fig. 44]
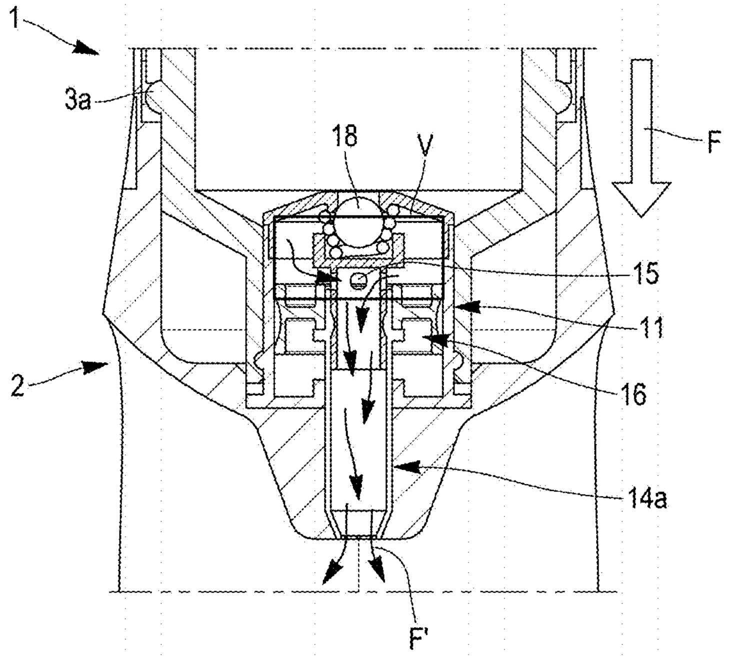

[Fig. 45]
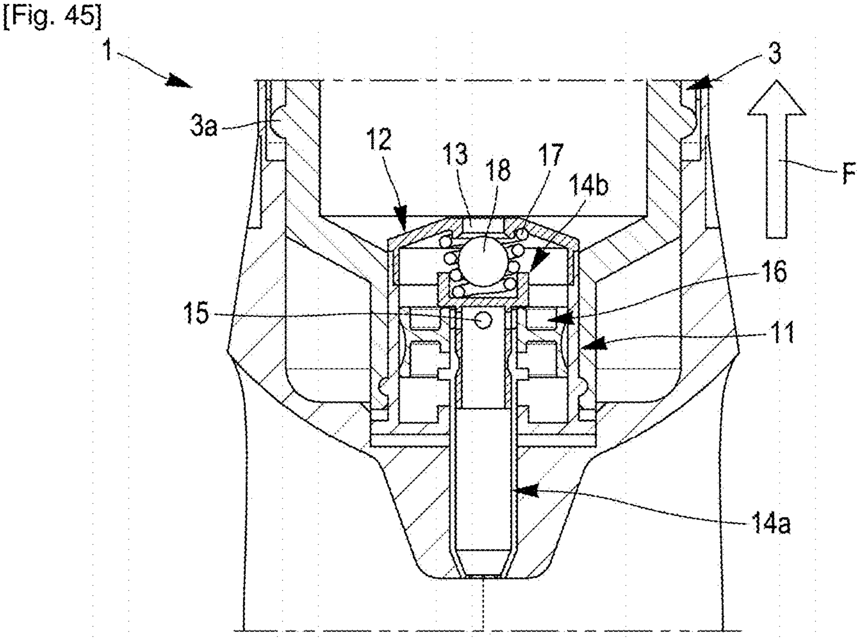
[Fig. 46]
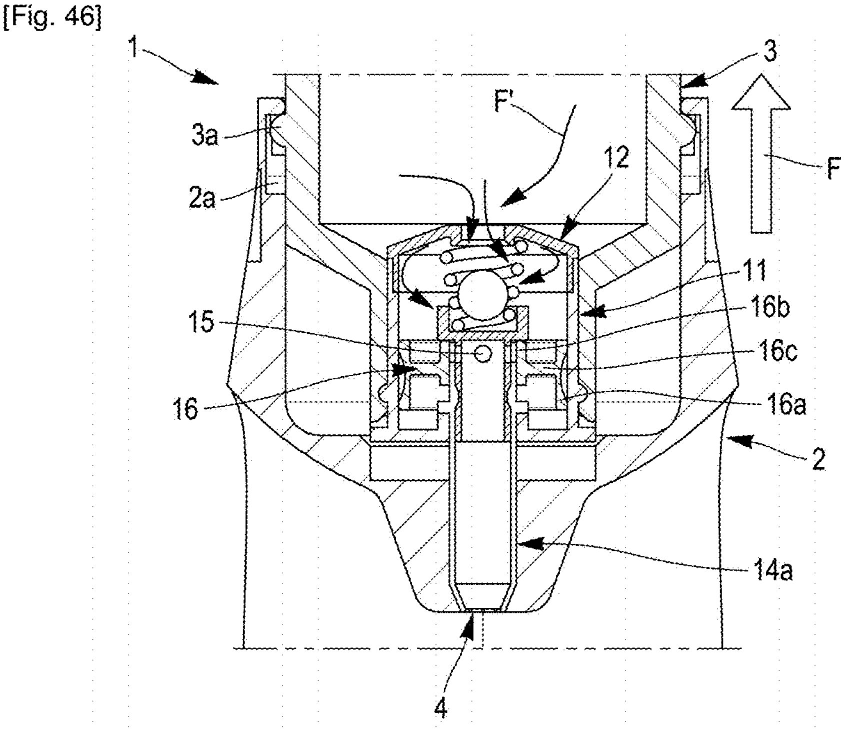

[Fig. 47]
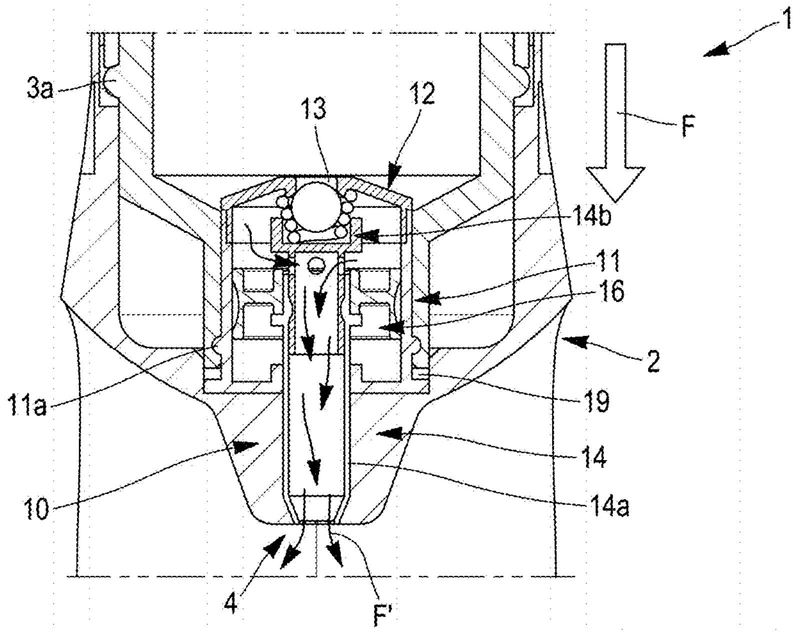
[Fig. 48]
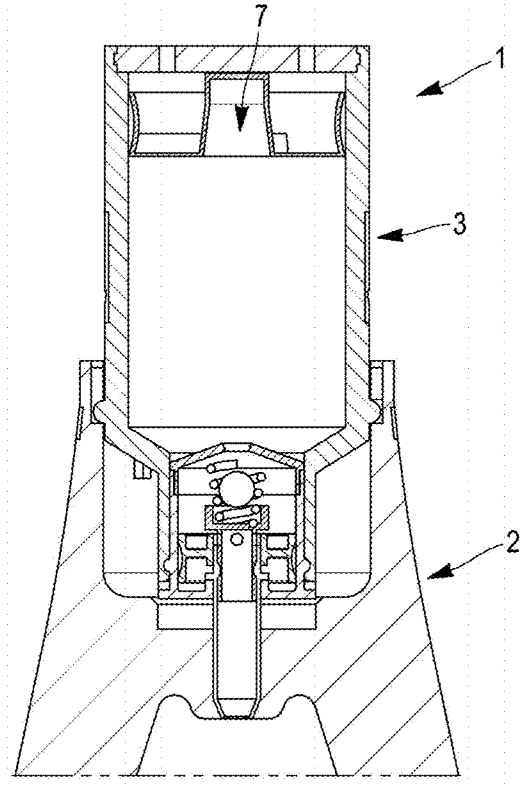

[Fig. 49]
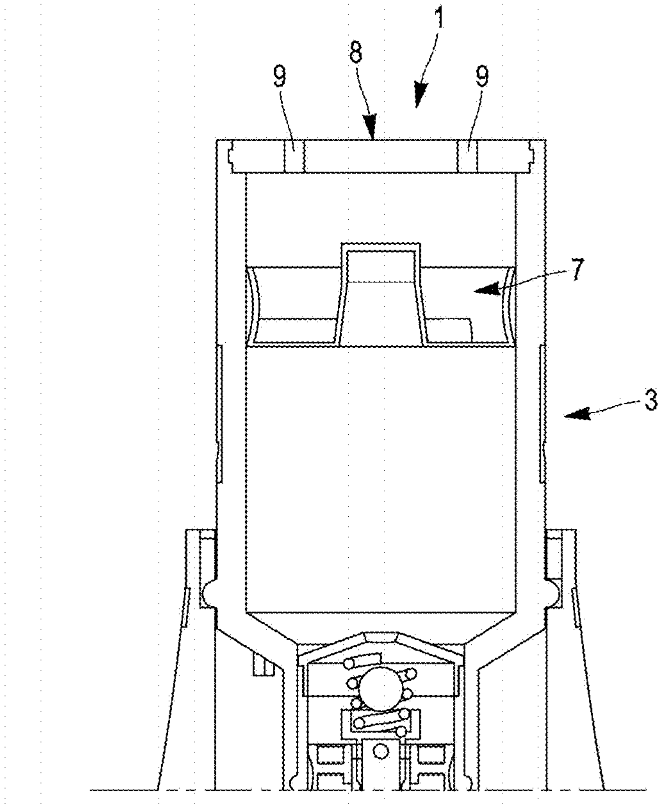

[Fig. 50]
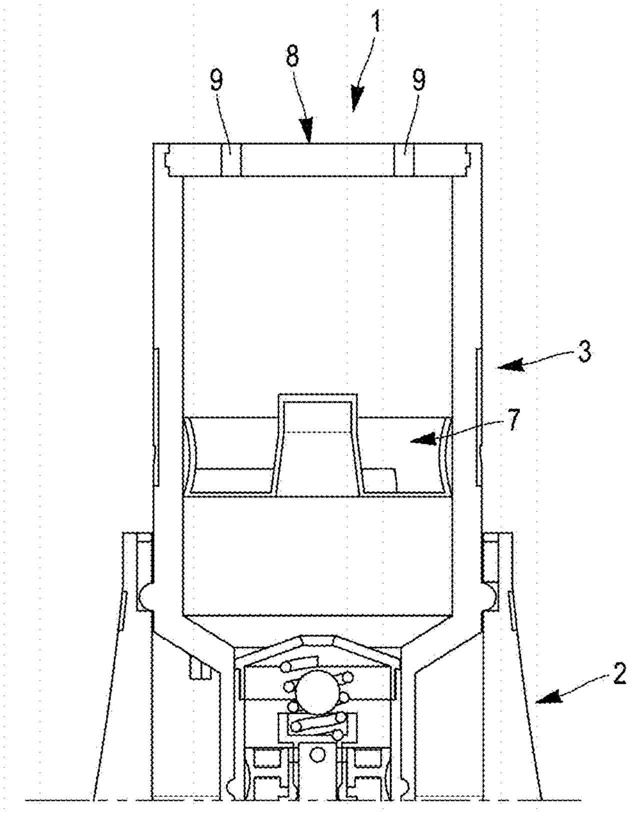

[Fig. 51]
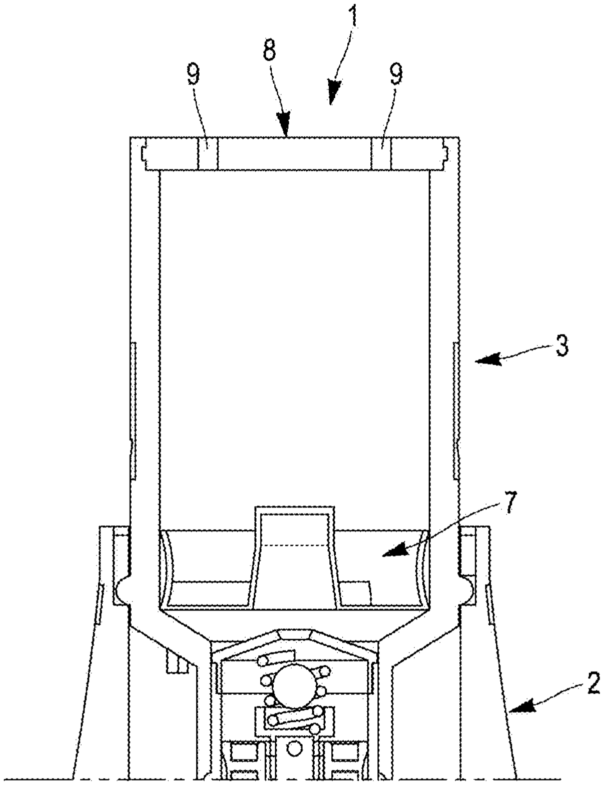

[Fig. 52]
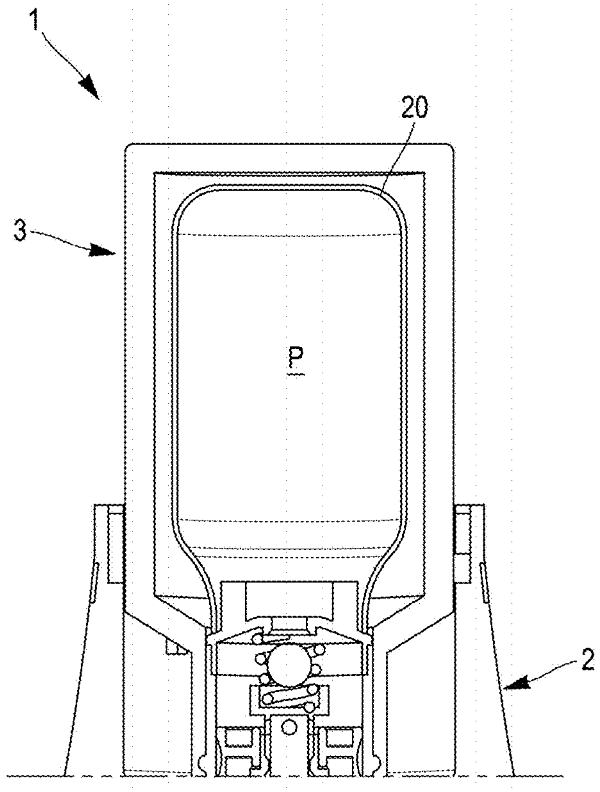
[Fig. 53]
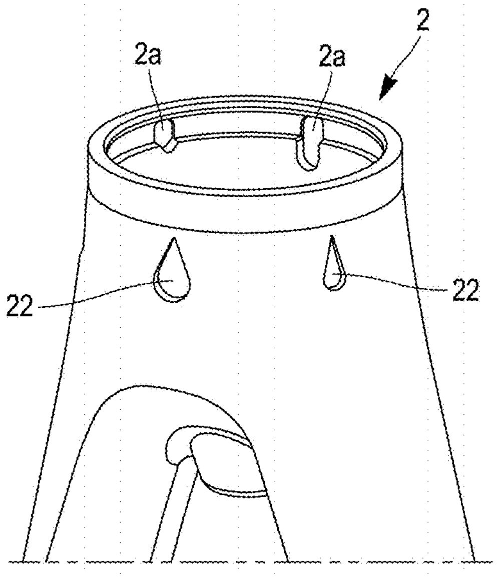

[Fig. 54]
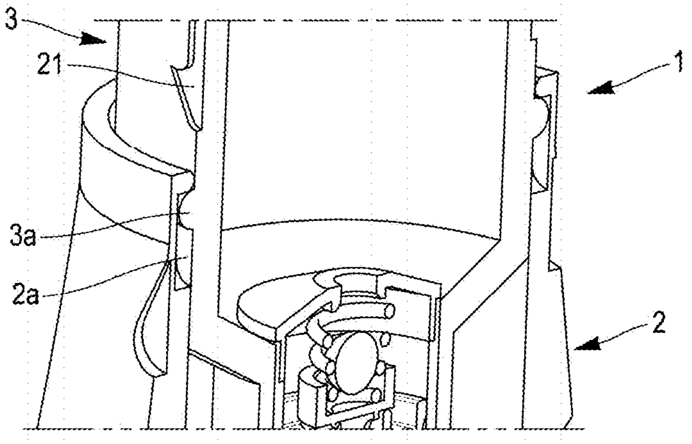
[Fig. 55]
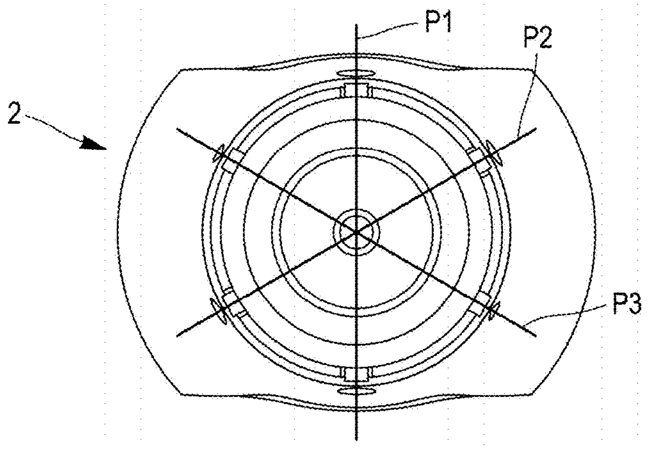
[Fig. 56]
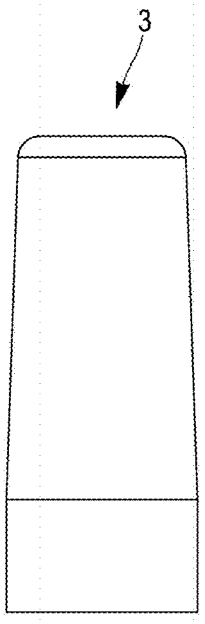

[Fig. 57]
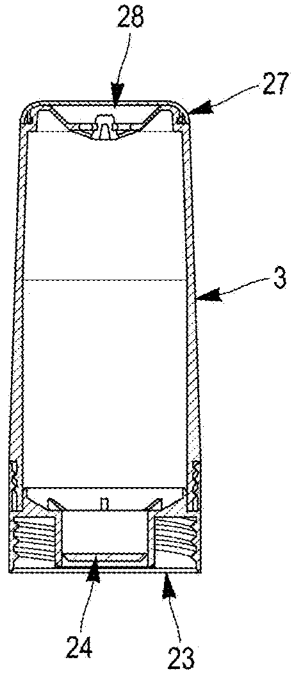
[Fig. 58]
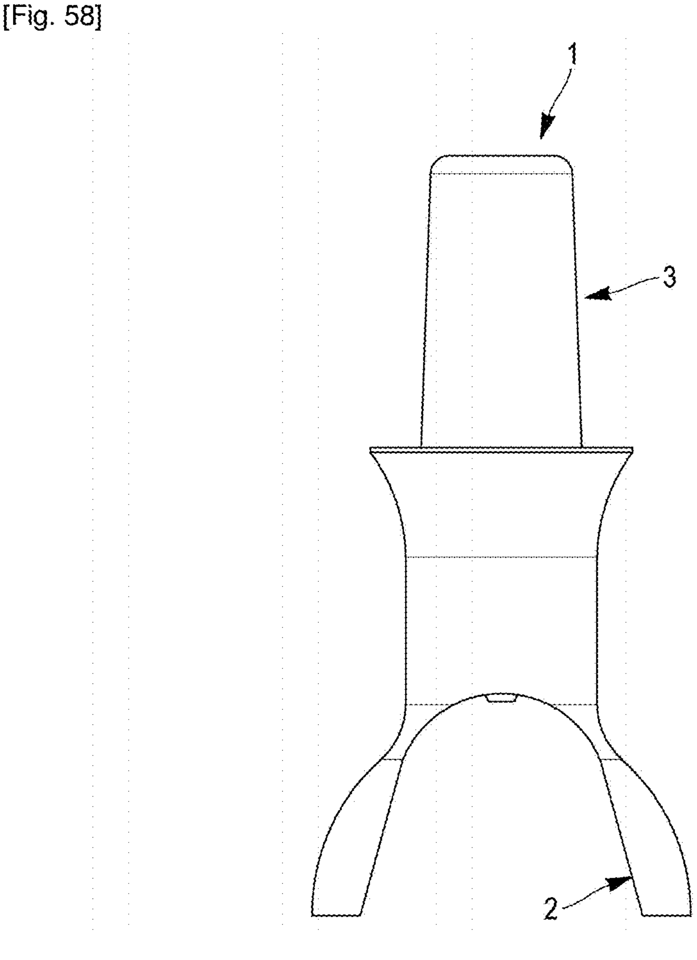

[Fig. 59]
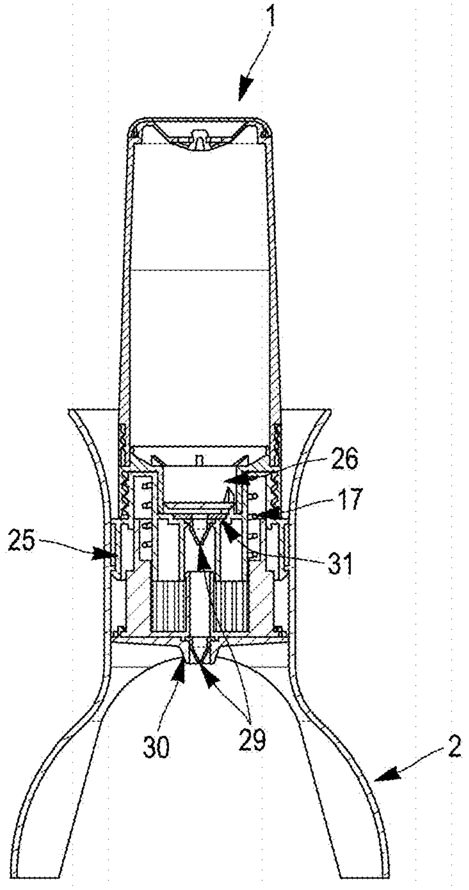
[Fig. 60]
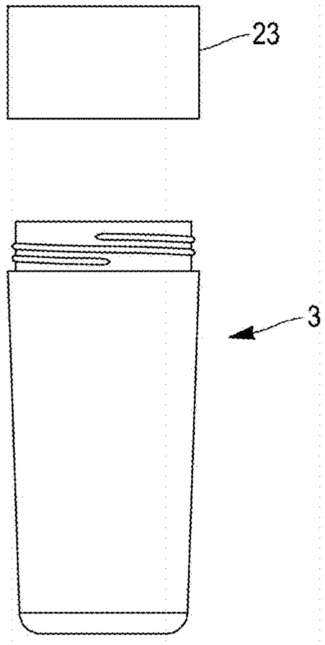

[Fig. 61]
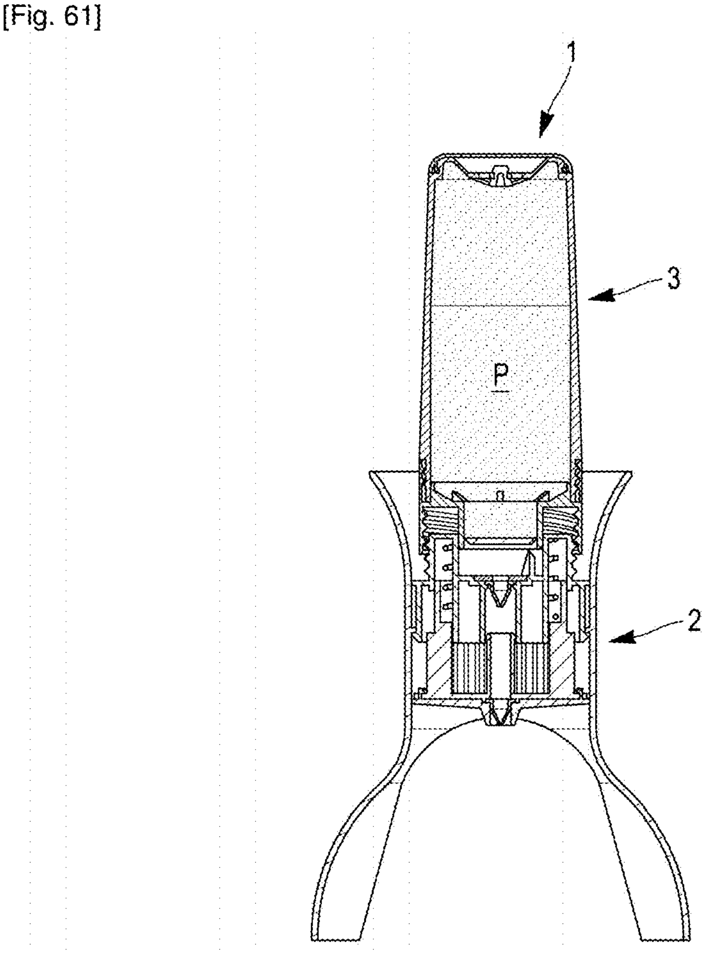

[Fig. 62]
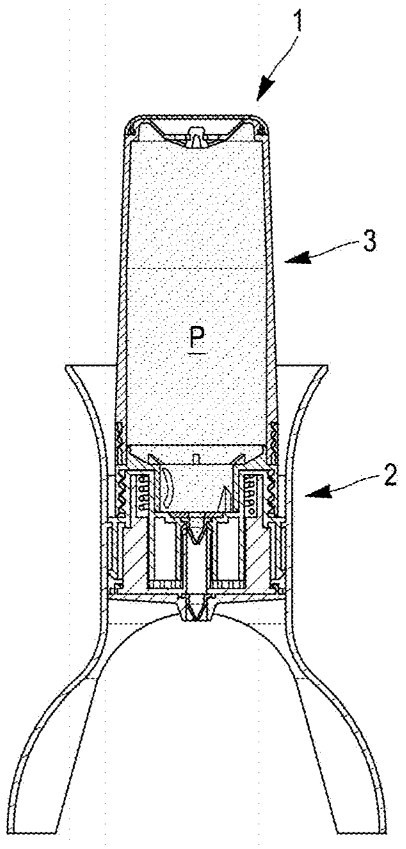

[Fig. 63]
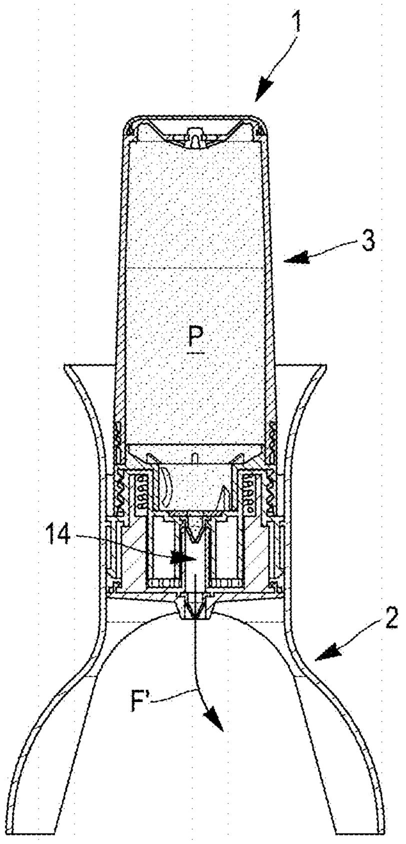

[Fig. 64]
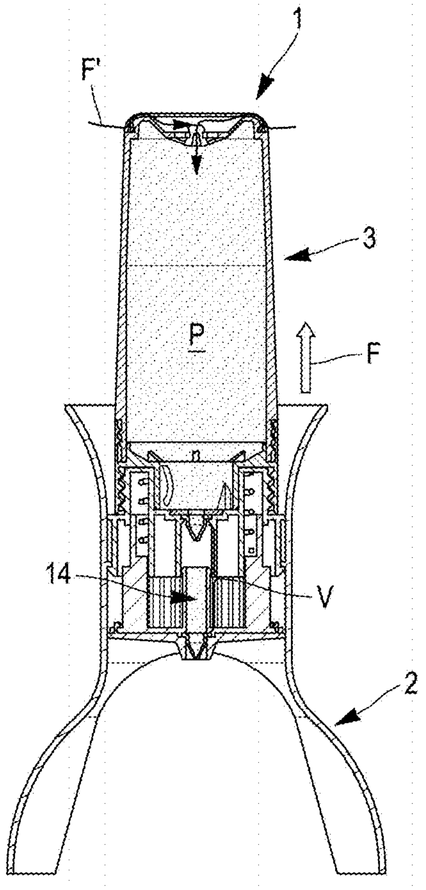

[Fig. 65]
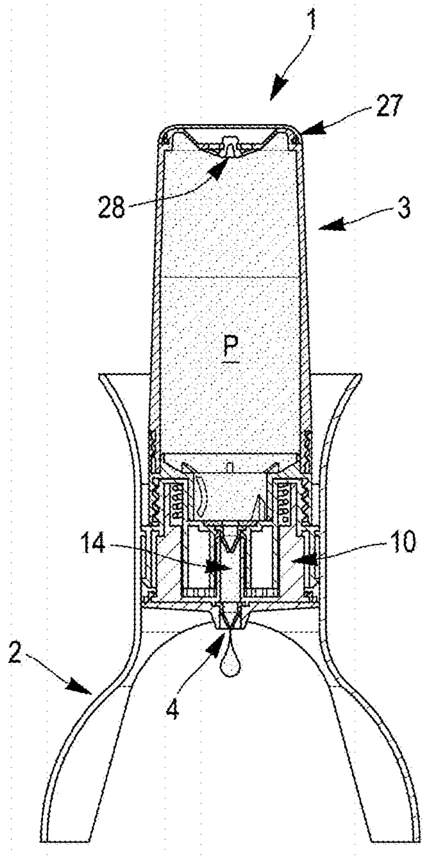

[Fig. 66]
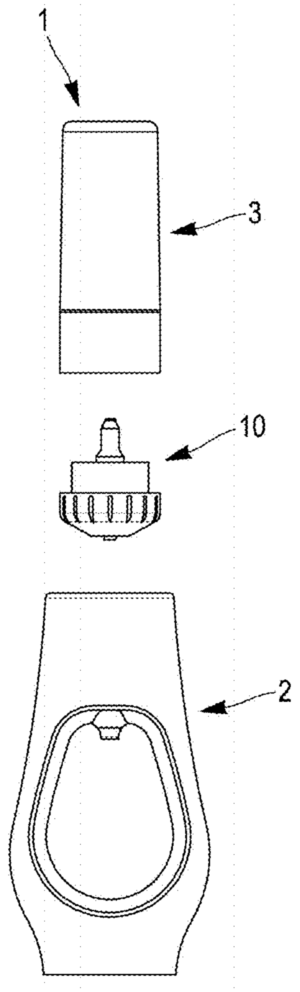

[Fig. 67]
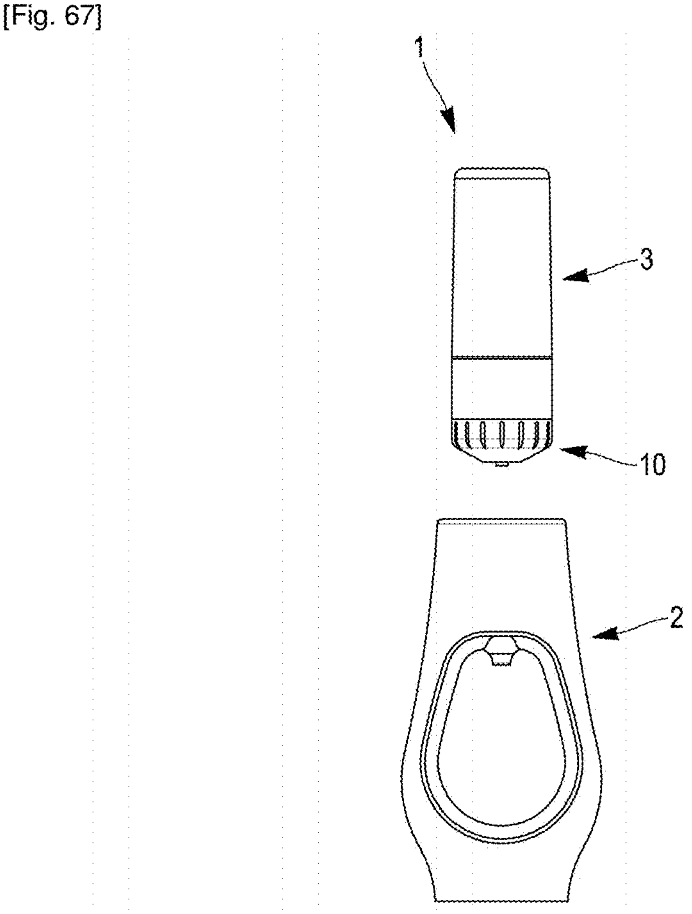

[Fig. 68]
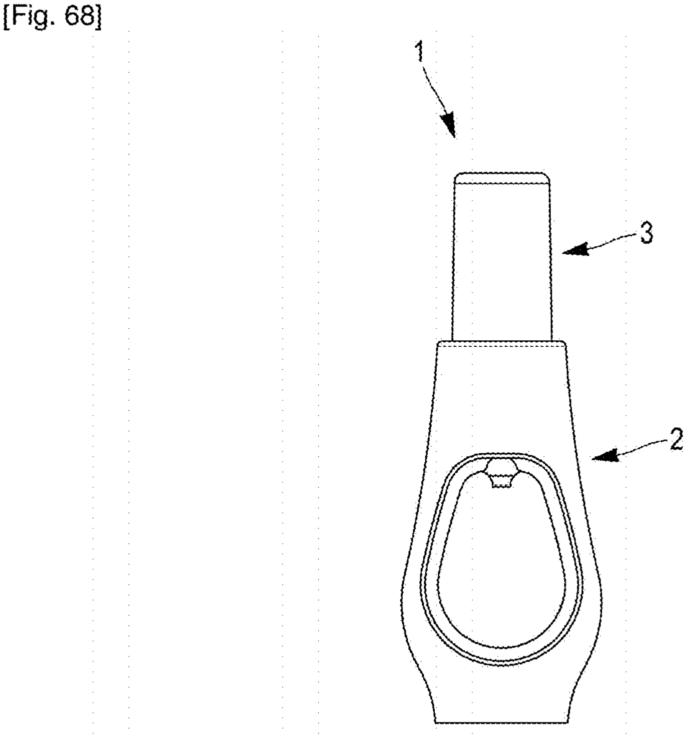

DROPPER DISPENSER

FIELD

The present invention concerns a dropper-type dispenser making it possible to dispense a fluid product in the form of drops. The drops are dispensed one after the other. The drop(s) fall from the dispenser by gravity onto a desired application surface. The preferred fields of application of the present invention are those of perfumery, cosmetics or even pharmacy.

BACKGROUND

It is known to deliver pharmaceutical and cosmetic products drop by drop by means of a dropper dispenser consisting of a pipette and of a suction/discharge system generally made by a simple elastomer teat.

More advanced suction/discharge systems also exist. They carry out suction by simply pressing a button or by unscrewing the dropper from the bottle.

Such devices are known in particular from documents EP 2854596 A1, KR 101462162 B1 and KR 200453126 Y1.

SUMMARY

The invention proposes a dropper dispenser providing simplified gestures, the dispenser being always ready for use and requiring minimal use of the user's hands.

The invention thus relates to a dropper dispenser comprising:

a) a bottle with a longitudinal axis, forming a reservoir of product to be dispensed, b) a base serving as a support for the bottle, c) a locking system making it possible to lock the bottle on the base, the bottle being, when locked on the base, axially movable between an upper end position and a lower end position, d) a product dispensing area, configured to allow the formation of drops of product, and e) a pump system, configured so that an axial displacement of the bottle from the lower position to the upper position causes air to move towards the bottom of the bottle, the air thus moved carrying with it the product present in the bottle to a product storage area (which is in particular distinct from the product dispensing area), and so that an axial displacement of the bottle from the upper end position to the lower end position causes the product to circulate from the product storage area to the dispensing area.

In a first embodiment, the pump system is integrated into the bottle.

In this case, the locking system may comprise at least one projection of the bottle cooperating by clipping with at least one associated groove of the base, each groove having for the projection associated with it a lower stop and an upper stop between which the projection is able to move axially, the position of said at least one projection in abutment against the lower stop defining the lower end position of the bottle and the position of said at least one projection in abutment against the upper stop defining the upper end position of the bottle.

The bottle may comprise two projections and the base may comprise two associated grooves.

The base may comprise several sets of two grooves, the grooves of each set having a height different from the height of the grooves of the other set(s).

The pump system may comprise:

a pump body, secured to an end area of the bottle and coaxial with said end area, a cover covering the pump body and provided with an axial orifice, a product dispensing tube, comprising at its lower end the product dispensing area which is advantageously in axial abutment against the base, an upper part of the product dispensing tube being housed in the pump body via a lower axial opening of the pump body, the pump body thus being movable in axial translation relative to the dispensing tube during an axial displacement of the bottle, the dispensing tube being provided at its upper end with a housing receiving a non-return valve comprising a ball resting on a spring, the spring being supported at its lower end on said housing and being supported at its upper end on an area of the cover located around the orifice of the cover, so that the ball comes to obstruct the orifice of the cover when the bottle is in its lower end position, and so that the ball is at a distance from the orifice of the cover when the bottle is in its upper end position, the dispensing tube further comprising in its upper part at least one radial orifice, a piston disposed radially between the product dispensing tube and the pump body, the piston comprising an internal annular portion and an external annular portion which is tightly mounted on the pump body so that a displacement of the pump body causes the piston to move, the internal annular portion being movable in axial translation between a lower stop and an upper stop of the product dispensing tube, the position of the piston when the internal annular portion abuts against the lower stop of the product dispensing tube defining a lower end position of the piston and the position of the piston when the internal annular portion abuts against the upper stop of the product dispensing tube defining an upper end position of the piston, the piston thus being in its upper end position when the bottle is in its upper end position and the piston being in its lower end position when the bottle is in its lower end position, the internal annular portion of the piston obstructing said at least one radial orifice of the dispensing tube when the piston is in its upper end position and not obstructing said at least one radial orifice of the dispensing tube when the piston is in its lower end position.

The bottle may comprise a movable bottom as well as a bottle bottom provided with at least one orifice.

Alternatively, the bottle may comprise a flexible pouch receiving the product to be dispensed.

In a second embodiment, the pump system is integrated into the base.

In this case, the base may comprise a base body and a ring axially movable relative to the base body between a lower end position of the ring and an upper end position of the ring, a spring secured to the body of the base allowing an axial displacement of the ring between its lower end position and its upper end position, the ring being provided with an outer thread, and the bottle may comprise a bottle body comprising at least one air inlet orifice communicating with a non-return valve allowing air to enter the bottle and preventing air from exiting the bottle, the bottle body being covered by a screwed head, the screwed head being provided with a first threaded area for screwing the screwed head onto the bottle body and with a second threaded area for screwing the screwed head onto the outer thread of the ring, the base further comprising a product dispensing tube which is in communication at its upper end with the screwed head of the bottle in the operational configuration of the device, the product dispensing tube being formed in the lower end position of the ring by an axial conduit of the base body and in the upper end position of the ring by the axial conduit of the body extended by an axial conduit of the ring, the product dispensing tube comprising at its upper end a non-return valve allowing the product to enter the dispensing tube and preventing the product from passing from the dispensing tube to the bottle, the dispensing tube comprising at its lower end a non-return valve forming the product dispensing area and which allows the product to exit the dispensing tube and which prevents the product from entering the dispensing tube.

The screwed head may be provided with a cover, for example a frangible cover, such as for example a lid, and the ring may comprise a cutting element capable of cutting at least part of the frangible cover when screwing the bottle onto the ring.

The non-return valves can be umbrella valves.

In a third embodiment, the pump system is independent of the base and of the bottle.

BRIEF DESCRIPTION OF THE DRAWINGS

Other characteristics and advantages of the present invention will appear on reading the detailed description below, of a non-limiting example of implementation, made with reference to the appended figures in which:

FIG. 1 is a perspective view of a dropper dispenser according to the invention, with a refill, FIG. 2 illustrates a first step of a method implementing the dispenser, FIG. 3 illustrates a second step of a method implementing the dispenser, FIG. 4 illustrates a third step of a method implementing the dispenser, FIG. 5 is a perspective view of the dispenser on a base, FIG. 6 is a perspective view of the dispenser, FIG. 7 is a front view of the dispenser, FIG. 8 is a side view of the dispenser, FIG. 9 is a top view of the dispenser, FIG. 10 is a perspective view of a bottle of the dispenser, FIG. 11 is a front view of the bottle, FIG. 12 is a sectional view of the bottle, FIG. 13 is a perspective view of a movable bottom of the bottle, FIG. 14 is a sectional view of the movable bottom, FIG. 15 is a perspective view of a bottom piece of the bottle, FIG. 16 is a perspective view of a base of the dispenser, FIG. 17 is a front view of the base, FIG. 18 is a sectional view of the base, FIG. 19 is a perspective view of a pump system of the dispenser, FIG. 20 is a front view of the pump system, FIG. 21 is a sectional view of the pump system, FIG. 22 is a perspective view of a pump body of the pump system, FIG. 23 is a front view of the pump body, FIG. 24 is a sectional view of the pump body, FIG. 25 is a perspective view of a cover of the pump body, FIG. 26 is a front view of the cover of the pump body, FIG. 27 is a sectional view of the cover of the pump body, FIG. 28 is a perspective view of an outlet tube of the pump system, FIG. 29 is a front view of the outlet tube, FIG. 30 is a sectional view of the outlet tube, FIG. 31 is a perspective view of a perforated tube of the pump system, FIG. 32 is a front view of the perforated tube, FIG. 33 is a sectional view of the perforated tube, FIG. 34 is a perspective view of a piston of the pump system, FIG. 35 is a front view of the piston, FIG. 36 is a sectional view of the piston, FIG. 37 is a perspective view of a spring of the pump system, FIG. 38 is a front view of the spring, FIG. 39 is a sectional view of the spring, FIG. 40 illustrates a ball of the pump system, FIG. 41 is a perspective view of a seal of the pump body, FIG. 42 is a sectional view of the dispenser in the rest position, FIG. 43 is a detailed sectional view of the dispenser in the rest position, FIG. 44 is a detailed sectional view of the dispenser when the bottle is in its lower end position, when a first pressure is put on the bottle, FIG. 45 is a detailed sectional view of the dispenser when the bottle is between its lower end position and its upper end position, FIG. 46 is a detailed sectional view of the dispenser when the bottle is in its upper end position, FIG. 47 is a detailed sectional view of the dispenser when the bottle is in its lower end position, when a further pressure is put on the bottle, FIG. 48 is a sectional view of the dispenser, when provided with a movable bottom, the movable bottom being in an upper end position, FIG. 49 is a sectional view of the dispenser, when provided with a movable bottom, the movable bottom being in a first intermediate position, FIG. 50 is a sectional view of the dispenser, when provided with a movable bottom, the movable bottom being in a second intermediate position, FIG. 51 is a sectional view of the dispenser, when provided with a movable bottom, the movable bottom being in a lower end position, FIG. 52 is a detailed sectional view of the dispenser, when provided with a pouch, FIG. 53 is a first detailed view of the base of the bottle, FIG. 54 is a second detailed view of the base of the bottle, FIG. 55 is a third detailed view of the base of the bottle, FIG. 56 is a front view of the bottle, in a second embodiment of the dropper dispenser according to the invention, FIG. 57 is a sectional view of the bottle of FIG. 56, FIG. 58 is a front view of the dispenser, in accordance with the second embodiment, FIG. 59 is a sectional view of the dispenser of FIG. 58, FIG. 60 is an exploded front view of the bottle of FIG. 56, FIG. 61 is a detailed sectional view of the dispenser, before screwing the bottle onto the base, FIG. 62 is a sectional view of the dispenser, after screwing the bottle onto the base, FIG. 63 is a detailed sectional view of the dispenser when the bottle is in its lower end position, when a first pression is put on the bottle, FIG. 64 is a detailed sectional view of the dispenser when the bottle is in its upper end position, FIG. 65 is a detailed sectional view of the dispenser when the bottle is in its lower end position, when a further pressure is put on the bottle, FIG. 66 is a first view of a dropper dispenser according to the invention, in accordance with a third embodiment, FIG. 67 is a second view of a dropper dispenser according to the invention, in accordance with the third embodiment, and FIG. 68 is a third view of a dropper dispenser according to the invention, in accordance with the third embodiment.

DETAILED DESCRIPTION OF EMBODIMENTS

As illustrated in FIG. 1, a dropper dispenser 1 according to the invention comprises a base 2 serving as a support for a bottle 3 containing a fluid cosmetic product. The dispenser 1 allows the dispensing of drops at a flow area 4.

The base 2 is equipped with a system for locking the bottle 3. It is designed to ensure the stability and the balance of the assembly.

The bottle 3 containing the cosmetic product integrates a pump system. The pump system allows air to pass into the bottle so that the bottle 3 does not deform during use.

The base 2 has an opening allowing the passage of the cosmetic product which can then be recovered at the open cell.

The operation of the dispenser 1 is as follows.

When using for the first time, the user 5 removes the cap protecting the bottle/the pump of the bottle. He then locks the bottle 3 onto the base 2 and can place the assembly thus secured on a work plan or on the edge of a sink. The dispenser 1 is then ready for use (FIG. 2).

Then simply press the bottle 3 to release the dose of product and collect it at the flow area 4 with the finger or an applicator (FIG. 3). The product can then be applied to the user (FIG. 4).

The user 5 will be able to adjust the dose using part or all of the stroke of the dispenser 1, either manually or via a dose indexing system described below.

Once the bottle 3 is empty, simply unlock it and replace it on the base 2 with a new bottle 3. It is possible to use bottles 3 of different formulas on the same base 2, one after the other, without risk of contamination of the formulas.

The dispenser 1 may comprise a membrane, for example made of silicone, placed at the outlet orifice of the cosmetic product, which makes it possible to limit the contact of air with the cosmetic product and therefore to prevent it from drying out. This also makes it possible to limit the phenomenon of hanging drops and to ensure the cleanliness of the base 2.

If the user 5 decides to remove the bottle 3 from its base 2 while it is not completely empty, he can keep it using a stopper obstructing the outlet orifice.

It is thus possible to carry out a bottle support 6 integrated into the base, providing the formulas necessary for the user's daily or weekly use, or more simply allowing refills to be available (FIG. 5).

FIGS. 6 to 55 illustrate a dropper dispenser 1 according to the invention, in accordance with a first embodiment. In this first embodiment, a pump system 10 is integrated into the bottle 3.

In a version without a pouch, the dispenser 1 comprises the base 2 (FIGS. 16 to 18) and a bottle 3 including a movable bottom 7 as well as a bottle bottom 8 provided with at least one orifice 9 (FIGS. 10 to 15).

The bottle 3 is provided with projections 3*a* (FIG. 12) intended to cooperate by clipping with associated grooves 2*a* of the base 2 (FIG. 16).

In this first embodiment, the pump system 10 comprises a pump body 11, a cover 12 covering the pump body 10 and which is provided with an axial orifice 13, a product dispensing tube 14 which may comprise a lower part 14*a* (an outlet tube) and an upper part 14*b* (a perforated tube) provided with radial orifices 15, a piston 16, a spring 17, a ball 18 and a seal 19 (FIGS. 19 to 41).

The pump body 11 comprises a rib 11*a* (FIG. 22) which allows the pump body 11 to be clipped into a groove 3*b* of the bottle 3 (FIG. 12).

The piston 16 comprises an internal annular portion 16*b* and an external annular portion 16*a*. The internal annular portion 16*b* and the eternal annular portion 16*a* are connected, at an intermediate height of the piston 16, by a transverse ring 16*c* (FIG. 36). So as to be able to be mounted tightly on the pump body 11, the external annular portion 16*a* may comprise an upper portion and a lower portion intended to be in contact with the pump body 11, the upper portion and the lower portion being connected by an intermediate portion with a diameter smaller than the diameter of the upper portion and the lower portion, the intermediate portion thus being intended not to be in contact with the pump body 11 when the piston 16 is inserted into the pump body 11.

FIG. 42 illustrates a rest position of the dropper dispenser 1.

In this position, the bottle 3 is filled with fluid product, the pump system 10 is in the rest position (the conical spring 17 is not compressed but it is still under stress), the reservoir is therefore in the high position.

The volume located between the transverse ring 16*c* of the piston 16 and the orifice 13 of the cover 12 will be called the chamber V (FIG. 43). The volume V is likely to vary during use of the product.

The user 5 then applies a pressure to the top of the bottle (FIG. 43). The displacement is represented by the arrow F (FIG. 44).

The bottle 3, the pump body 11 and the pump body cover 12 translate downwards until they come into abutment against the base 2 (each projection 3*a* of the bottle moves between a lower stop 2*a*1 and an upper stop 2*a*2 which axially delimit the groove 2*a*). The pump body cover 12 compresses the conical spring 17 and the ball 18 obstructs the orifice 13 of the cover 12. The ball 18-conical spring 17 assembly has a non-return valve function.

The piston 16 compresses in turn the volume of air located in the chamber V. The air is expelled from the chamber V (represented by the arrows F') and moves towards the outlet tube 14*a* passing by the orifices 15 of the perforated tube 14*b* (FIG. 44).

The user 5 then releases the pressure exerted on the bottle 3 (FIG. 45).

During this phase, the user 5 stops pressing the bottle 3, which is then pushed upwards thanks to the spring 17.

When there is no more pressure exerted on the bottle 3, the spring 17 will push the cover 12 upwards, thus releasing the orifice of inlet of the cosmetic product. Indeed, under the effect of gravity, the ball 18 will be attracted downwards and will bear against the conical spring 17.

When the bottle 3 is raised, the pump body 11 drives the piston 16 upwards. In fact, the piston 16 is adjusted slightly tightly on the pump body 11 (the piston 16 is thus secured to the pump body 11). When the piston 16 translates until it is in abutment against the perforated tube 14*b*, the latter will obstruct the orifices 15 of the perforated tube 14*b*.

In a second step, the bottle 3 will continue to rise until it reaches the upper stop (FIG. 46). During this phase, a vacuum is created by increasing the volume of the chamber V. The cosmetic product is therefore sucked into the chamber V of the mechanism (as shown diagrammatically by the arrows F').

The configuration illustrated in FIG. 47 is identical to the second configuration, except that this time the cosmetic product is expelled from the chamber V and not air. The second configuration only concerns the first use of the dispenser 1.

Once again, the user 5 comes to apply a pressure on the bottle of the dropper dispenser 1.

The bottle 3, the pump body 11 and the pump body cover 12 translate downwards until they come into abutment against the base 2. The pump body cover 12 compresses the conical spring 17 and the ball 18 obstructs the orifice 13 of the cover 12.

This time, the pump body 11 drives the piston 16 downwards in order to release the outlet orifices 15 of the perforated tube 14*b*.

The piston 16 compresses in turn the volume of cosmetic product located in the chamber V. The cosmetic product is expelled from the chamber V and moves towards the outlet tube 14*a* passing by the orifices 15 of the perforated tube 14*b*.

Thus, in this first embodiment:

The product dispensing tube 14 comprises at its lower end the product dispensing area 4 which is in axial abutment against the base 2, the perforated tube 14*b* being housed in the pump body 11 via a lower axial opening 11*b* of the pump body 11.

The pump body 11 is thus movable in axial translation relative to the dispensing tube 14 during an axial displacement of the bottle 3, the perforated dispensing tube 14*b* being provided at its upper end with a housing 14*b*1 (FIG. 33) receiving the non-return valve comprising the ball 18 resting on the spring 17. The spring 17 is supported at its lower end on the housing 14*b*1 and is supported at its upper end on an area of the cover located around the orifice 13 of the cover 12, the ball 18 obstructing the orifice 13 of the cover 12 when the bottle 3 is in its lower end position, and the ball 18 being at a distance from the orifice 13 of the cover 12 when the bottle 3 is in its upper end position, the perforated tube 14*b* further comprising at least one radial orifice 15.

The piston 16 is disposed radially between the product dispensing tube 14 and the pump body 11, the piston 16 comprising an internal annular portion 16*b* and an external annular portion 16*a* tightly mounted on the pump body 11 so that a displacement of the pump body 11 causes a displacement of the piston 16, the internal annular portion being movable in axial translation between a lower stop and an upper stop of the product dispensing tube 14, the position of the piston 16 when the internal annular portion 16*b* is in abutment against the lower stop of the product dispensing tube 14 defining a lower end position of the piston 16 and the position of the piston 16 when the internal annular portion 16*b* is in abutment against the upper stop of the product dispensing tube 14 defining an upper end position of the piston 16, the piston 16 thus being in its upper end position when the bottle 3 is in its upper end position and the piston 16 being in its lower end position when the bottle 3 is in its lower end position, the internal annular portion 16*b* of the piston 16 obstructing the orifices 15 of the dispensing tube 14 when the piston 16 is in its upper end position and not obstructing the orifices 15 of the dispensing tube 14 when the piston 16 is in its lower end position.

In this first embodiment, the bottle 3 may or may not comprise a pouch forming a reservoir of fluid product to be dispensed.

In the configuration without a pouch, illustrated in FIGS. 48 to 51, the bottle 3 may comprise a movable bottom 7. When the bottle 3 is pressed and the fluid product is taken, the movable bottom 7 will move downwards.

In order to balance the pressure between the movable bottom 7 and the bottom of the bottle 3, the two orifices 9 of the bottom of the bottle 8 allow air to pass into the bottle 3. The passage of air allows the pressures to be balanced and allows the movable bottom 7 to descend. Thus, there will be no vacuum inside the bottle 3 and therefore no deformation of the latter.

The movable bottom 7 ensures a certain seal so that the product cannot escape from the bottle 3 when the assembly is turned over.

As the bottle 3 is used, the movable bottom 7 moves from top to bottom (FIGS. 48 to 51). The movable bottom 7 makes it possible to obtain an excellent restitution rate since the movable bottom 7 rubs the walls of the bottle 3 and brings all the product back to the inlet of the pump system 10.

In the configuration with pouch, illustrated in FIG. 52, a pouch 20 is inserted into the bottle 3. There is no need for a movable bottom because the pouch 20 deforms during use of the product. Over time, the pouch 20 will deform and will thus offer a good restitution rate of the product.

In order to be able to set the quantity of product to be dispensed, an indexing mechanism can be used.

When changing a bottle, the user clips the bottle 3, which has two lugs 3*a*, into a groove 2*a* located inside the base 2.

In a second step, the user turns the bottle 3 so as to align the mark located on the bottle (shown diagrammatically by an arrow 21) opposite an indicator of dispensed quantity located on the base. The indicator is shown diagrammatically by a drop 22 of varying size depending on the associated quantity of dispensed product (FIG. 53).

When the bottle 3 is clipped onto the base 2, the two lugs 3*a* of the bottle 3 are housed in the groove 2*a* of the base 2.

Opposite each drop 22 are grooves 2*a* making it possible to limit more or less the stroke of the two lugs 3*a* and therefore of the bottle 3.

The longer the stroke, the greater the volume that will be sucked in and compressed. And the longer the stroke, the greater the quantity of delivered product.

For example, in the configuration illustrated in FIG. 54 (position P1), the setting allows the largest quantity of product to be delivered.

To change this setting, simply turn the bottle 3 until reaching the desired position.

FIG. 55 is a top sectional view of the base 2, in order to better visualize the different positions. There are two channels per position because there are two lugs 3*a*, which offers a total of three different positions: P1, P2 and P3. There is a 60° angle between each groove (channel).

FIGS. 56 to 65 illustrate a dropper dispenser 1 according to the invention, in accordance with a second embodiment. In this second embodiment, the pump system 10 is integrated into the base 2. This ecological solution allows the user to keep and reuse the base 2 integrating the pump system 10, and the bottle 3 containing only the cosmetic product P can thus be recycled once emptied.

Once filled, the bottle 3 is closed thanks to a screwed head 23, in particular a screwed head which cannot be unscrewed subsequently, for example by means of anti-unscrewing notches. If the head is not screwed, it can be ultrasonically welded to the bottle after filling.

The head 23 has an integrated lid 24.

The user first screws the bottle 3 onto a thread of a ring 25 (collar) located inside the base 2. During screwing, a knife 26 present inside the ring 25 will partially cut the lid 24. A washer 31 can be disposed under the lid 24 and supported on the ring 25 (FIGS. 61 and 62). The washer 31, fastened/welded to the collar 25, makes it possible to hold the valve of the collar in place.

The base 2 thus comprises a base body and the ring 25 which is axially movable relative to the base body between a lower end position and an upper end position. A spring 17 allows an axial displacement of the ring 25 between its lower end position and its upper end position, the ring 25 being provided with an outer thread.

The bottle 3 comprises a bottle body comprising at least one air inlet orifice 27 communicating with a non-return valve 28 allowing air to enter the bottle 3 and preventing air from escaping, the bottle 3 being covered by the screwed head 23 provided with the lid 24 (FIG. 57).

The screwed head 23 is provided with a first threaded area for screwing the screwed head onto the bottle 3 and with a second threaded area for screwing the screwed head onto the outer thread of the ring 25.

The base 2 further comprises a product dispensing tube 14 comprising at its upper end an area of the base which is an area for receiving the lid 24, said receiving area being provided with a non-return valve 29 authorizing the entry of the product P into the dispensing tube 14 and preventing the passage of the product P from the dispensing tube 14 to the bottle 3, the dispensing tube 14 comprising at its lower end a non-return valve 29 forming the product dispensing area 4 delimited by an end piece 30 and which authorizes the exit of the product P from the dispensing tube 14 and which prevents an entry of the product P into the dispensing tube 14 (FIG. 59).

When the bottle 3 is screwed onto the base 2, the user presses on the bottle 3. During the first use, air will come out at the outlet orifice (FIG. 63). When the bottle 3 rises under the action of a spring 17, cosmetic product P enters the chamber V, and air enters through the vents 27 and the umbrella valve 28 (FIG. 64). Thus, the bottle 3 is not deformed.

The user presses on the bottle 3 again, which makes it possible to dispense a dose of cosmetic product P (FIG. 65).

Once the bottle 3 is in place, the user must empty it completely before being able to put in a new one, otherwise if the bottle is removed during use, the remaining cosmetic product will leak.

In this second embodiment, low-viscous cosmetic products are preferred. If the product is very viscous and the user, after removing the bottle, leaves the base empty for a while, the cosmetic product remaining in the pump in the open air could dry out and clog the pump. Therefore, if the product is too viscous, it will be preferable to implement the dispenser according to the first embodiment, with a pump system integrated into the bottle, so that it is changed for each new refill.

Alternatively, it can be considered that the base does not have a bottom.

Finally, as described above for the first embodiment, the base can be equipped with a system for setting the dose of delivered product, making it possible to limit the stroke of the bottle more or less. Thus, the user will be able to choose the stroke associated with a dose of product dispensed according to his needs. The greater the stroke of the bottle, the greater the quantity of delivered product.

In a third embodiment, illustrated in FIGS. 66 to 68, the pump system 10 is independent of the base 2 and of the bottle 3. It is thus possible to clean the pump each time it is refilled, to have different pumps with different dosages which can be adapted to the product used, and to only have to buy the pump again if it ever stops working.

A conventional dropper dispenser requires holding the bottle in one hand and a pipette in the other hand to draw up the cosmetic product. It is then necessary to deliver the product with the pipette in the hand or directly onto the face, but once the dose of product is delivered, it is necessary to know what to do with the pipette.

With the dispenser according to the invention, it is possible to simplify the gestures because one hand is used to actuate the bottle to deliver the dose of product and the other hand is used to collect the dose of product. Then, both hands are free to apply the product to the face. This reduces the risks of falling, breaking and losing the product.

In addition, the device is always ready to use and has the advantage of maximizing the restitution rate of the cosmetic product by inverting the bottle. This is often not the case for a conventional dropper dispenser whose pipette does not go to the bottom of the bottle or if the bottom of the bottle is curved the pipette cannot recover the product which is on the periphery.

The dispenser according to the first embodiment makes it possible to deliver more viscous cosmetic products and also to protect the product from the risks of contamination and oxidation due to its "airless" operation.

The dispenser according to the invention can therefore advantageously replace the conventional dropper dispensers.

The invention claimed is:

1. A dropper dispenser comprising:

a) a bottle with a longitudinal axis, forming a reservoir of product to be dispensed, b) a base serving as a support for the bottle, c) a locking system configured to lock the bottle on the base, the bottle being, when locked on the base, axially movable between an upper end position and a lower end position, d) a product dispensing area configured to allow the formation of drops of product, e) a pump system configured so that an axial displacement of the bottle from the lower position to the upper position causes air to move towards the bottom of the bottle, the air thus moved carrying with it the product present in the bottle to a product storage area, and so that an axial displacement of the bottle from the upper end position to the lower end position causes the product to circulate from the product storage area to the dispensing area.

2. The dispenser according to claim 1, wherein the pump system is integrated into the bottle.

3. The dispenser according to claim 2, wherein the locking system comprises at least one projection of the bottle cooperating by clipping with at least one associated groove of the base, each groove having for the projection associated with it a lower stop and an upper stop between which the projection is able to move axially, the position of said at least one projection in abutment against the lower stop defining the lower end position of the bottle and the position of said at least one projection in abutment against the upper stop defining the upper end position of the bottle.

4. The dispenser according to claim 3, wherein the bottle comprises two projections and in that the base comprises two associated grooves.

5. The dispenser according to claim 4, wherein the base comprises several sets of two grooves, the grooves of each set having a height different from the height of the grooves of the other set(s).

6. The dispenser according to claim 5, wherein the pump system comprises:

a pump body secured to an end area of the bottle and coaxial with said end area, a cover covering the pump body and provided with an axial orifice, a product dispensing tube comprising, at its lower end, the product dispensing area which is in axial abutment against the base, an upper part of the product dispensing tube being housed in the pump body via a lower axial opening of the pump body, the pump body thus being movable in axial translation relative to the dispensing tube during an axial displacement of the bottle, the dispensing tube being provided at its upper end with a housing receiving a non-return valve comprising a ball resting on a spring, the spring being supported at its lower end on said housing and supported at its upper end on an area of the cover located around the orifice of the cover, so that the ball (18) comes to obstruct the orifice of the cover when the bottle is in its lower end position, and so that the ball is at a distance from the orifice of the cover when the bottle is in its upper end position, the dispensing tube further comprising in its upper part at least one radial orifice, a piston disposed radially between the product dispensing tube (14) and the pump body, the piston comprising an internal annular portion and an external annular portion which is tightly mounted on the pump body so that a displacement of the pump body causes the piston to move, the inner annular portion being movable in axial translation between a lower stop and an upper stop of the product dispensing tube, the position of the piston when the internal annular portion abuts against the lower stop of the product dispensing tube defining a lower end position of the piston and the position of the piston when the internal annular portion abuts against the upper stop of the product dispensing tube defining an upper end position of the piston, the piston thus being in its upper end position when the bottle is in its upper end position and the piston being in its lower end position when the bottle is in its lower end position, the internal annular portion of the piston obstructing said at least one radial orifice of the dispensing tube when the piston is in its upper end position and not obstructing said at least one radial orifice of the dispensing tube when the piston is in its lower end position.

7. The dispenser according to claim 6, wherein the bottle comprises a movable bottom as well as a bottle bottom provided with at least one orifice.

8. The dispenser according to claim 6, wherein the bottle comprises a flexible pouch receiving the product to be dispensed.

9. The dispenser according to claim 1, wherein the pump system is integrated into the base.

10. The dispenser according to claim 9, wherein the base comprises a base body and a ring axially movable relative to the base body between a lower end position of the ring and an upper end position of the ring, a spring secured to the base body allowing an axial displacement of the ring between its lower end position and its upper end position, the ring being provided with an outer thread, and in that the bottle comprises a bottle body comprising at least one air inlet orifice communicating with a non-return valve allowing air to enter the bottle and preventing air from exiting the bottle, the bottle body being covered by a screwed head, the screwed head being provided with a first threaded area for screwing the screwed head onto the bottle body and with a second threaded area for screwing the screwed head onto the outer thread of the ring, the base further comprising a product dispensing tube which is in communication at its upper end with the screwed head of the bottle in the operational configuration of the device, the product dispensing tube being formed in the lower end position of the ring by an axial conduit of the base body and in the upper end position of the ring by the axial conduit of the base body extended by an axial conduit of the ring, the product dispensing tube comprising at its upper end a non-return valve allowing the product to enter the dispensing tube and preventing the product from passing from the dispensing tube to the bottle, the dispensing tube comprising at its lower end a non-return valve forming the product dispensing area and which allows the product to exit the dispensing tube and which prevents the product from entering the dispensing tube.

11. The dispenser according to claim 10, wherein the screwed head is provided with a frangible cover and in that the ring comprises a cutting element capable of cutting at least part of the frangible cover when screwing the bottle onto the ring.

12. The dispenser according to claim 11, wherein the non-return valves are umbrella valves.

13. The dispenser according to claim 1, wherein the pump system is independent of the base and of the bottle.

* * * * *